United States Patent
Benslimane

(10) Patent No.: US 8,891,222 B2
(45) Date of Patent: Nov. 18, 2014

(54) CAPACITIVE TRANSDUCER AND A METHOD FOR MANUFACTURING A TRANSDUCER

(75) Inventor: Mohamed Yahia Benslimane, Nordborg (DK)

(73) Assignee: Danfoss A/S, Nordborg (DK)

( * ) Notice: Subject to any disclaimer, the term of this patent is extended or adjusted under 35 U.S.C. 154(b) by 96 days.

(21) Appl. No.: 13/396,137

(22) Filed: Feb. 14, 2012

(65) Prior Publication Data
US 2013/0208397 A1    Aug. 15, 2013

(51) Int. Cl.
H01G 5/012    (2006.01)

(52) U.S. Cl.
USPC ........... 361/286; 361/277; 361/273; 361/278; 361/290; 361/292

(58) Field of Classification Search
USPC ......... 361/286, 277–278, 290–292, 272, 273, 361/283.1–283.3; 310/328, 369
See application file for complete search history.

(56) References Cited

U.S. PATENT DOCUMENTS

| | | |
|---|---|---|
| 2,130,532 A | 9/1938 | Bailey |
| 2,716,708 A | 8/1955 | Bradfield |
| 3,109,202 A | 11/1963 | Beckadolph et al. |
| 3,138,962 A | 6/1964 | Haines, Jr. et al. |
| 3,544,733 A | 12/1970 | Reylek et al. |
| 3,565,195 A | 2/1971 | Miller et al. |
| 3,753,294 A | 8/1973 | Attali et al. |
| 3,831,629 A | 8/1974 | Mackal et al. |
| 3,875,481 A | 4/1975 | Miller et al. |
| 3,898,585 A | 8/1975 | Heidrich et al. |
| 3,898,722 A | 8/1975 | Foote |
| 3,912,830 A | 10/1975 | Murayama et al. |
| 4,259,607 A | 3/1981 | Noguchi et al. |
| 4,266,263 A | 5/1981 | Haberl et al. |
| 4,322,877 A | 4/1982 | Taylor |

(Continued)

FOREIGN PATENT DOCUMENTS

| | | |
|---|---|---|
| DE | 30 06 620 A1 | 9/1981 |
| DE | 30 23 218 A1 | 2/1982 |

(Continued)

OTHER PUBLICATIONS

International Search Report for PCT Serial No. PCT/DK2013/000014 dated May 14, 2013.
Soo-Lim Chua et al. "Multi-Walled Carbon Nanotubes (MWCNT) as Compliant Electrodes for Dielectric Elastomer Actuators" vol. 7976, Mar. 24, 2011 p. 79760V, XP055062885; ISSN: 0277-786X, DOI 10.1117/12.880486.

(Continued)

*Primary Examiner* — Nguyen T Ha
(74) *Attorney, Agent, or Firm* — McCormick, Paulding & Huber LLP

(57) ABSTRACT

A capacitive transducer (1) comprises a polymer film (2) having a first surface and a second surface, a first electrically conductive layer (3) arranged on the first surface of the polymer film (2), and a second electrically conductive layer (3) arranged on the second surface of the polymer film (2). The polymer film (2) is at least partly made from a material having a molecular weight which is at least 21,000 g/mol. The inventors have surprisingly found that silicone polymer materials with high molecular weights, such as liquid silicone rubbers (LSR) or high temperature vulcanizing (HTV) elastomers, have high electrical breakdown strengths, even though technical data sheets from manufacturers state almost identical electrical breakdown strengths similar to that of RTV-2 elastomers. Using such materials in capacitive transducers allows high electrical fields to be applied to transducers without risking electrical breakdown, thereby increasing performance of transducers.

17 Claims, 9 Drawing Sheets

(56) References Cited

U.S. PATENT DOCUMENTS

| | | |
|---|---|---|
| 4,330,730 A | 5/1982 | Kurz et al. |
| 4,370,697 A | 1/1983 | Haberl et al. |
| 4,376,302 A | 3/1983 | Miller |
| 4,384,394 A | 5/1983 | Lemonon et al. |
| 4,386,386 A | 5/1983 | Akita |
| 4,431,882 A | 2/1984 | Frame |
| 4,494,409 A | 1/1985 | Kondo et al. |
| 4,549,093 A | 10/1985 | Severwright |
| 4,584,625 A | 4/1986 | Kellogg |
| 4,634,917 A | 1/1987 | Dvorsky et al. |
| 4,640,137 A | 2/1987 | Trull et al. |
| 4,654,546 A | 3/1987 | Kirjavainen |
| 4,654,834 A | 3/1987 | Dorr |
| 4,731,694 A | 3/1988 | Grabner et al. |
| 4,786,837 A | 11/1988 | Kalnin et al. |
| 4,825,116 A | 4/1989 | Itoh et al. |
| 4,829,812 A | 5/1989 | Parks et al. |
| 4,836,033 A | 6/1989 | Seitz |
| 4,852,443 A | 8/1989 | Duncan et al. |
| 4,866,412 A | 9/1989 | Rzepczynski |
| 4,879,698 A | 11/1989 | Langberg |
| 4,935,079 A | 6/1990 | Nelson-Ashley et al. |
| 4,986,136 A | 1/1991 | Brunner et al. |
| 5,016,008 A | 5/1991 | Gruaz et al. |
| 5,028,876 A | 7/1991 | Cadwell |
| 5,048,536 A | 9/1991 | McEwen |
| 5,060,527 A | 10/1991 | Burgess |
| 5,090,246 A | 2/1992 | Colla et al. |
| 5,090,248 A | 2/1992 | Cimmino et al. |
| 5,115,680 A | 5/1992 | Lew |
| 5,172,024 A | 12/1992 | Broussoux et al. |
| 5,173,162 A | 12/1992 | Hagimura et al. |
| 5,225,959 A | 7/1993 | Stearns |
| 5,233,261 A | 8/1993 | Wajid |
| 5,255,972 A | 10/1993 | Shirasu |
| 5,259,099 A | 11/1993 | Banno et al. |
| 5,300,813 A | 4/1994 | Joshi et al. |
| 5,319,153 A | 6/1994 | Fishman |
| 5,321,332 A | 6/1994 | Toda |
| 5,325,012 A | 6/1994 | Sato et al. |
| 5,341,062 A | 8/1994 | Cero, Jr. et al. |
| 5,410,210 A | 4/1995 | Sato et al. |
| 5,425,275 A | 6/1995 | Lockshaw |
| 5,447,076 A | 9/1995 | Ziegler |
| 5,449,002 A | 9/1995 | Goldman |
| 5,494,090 A | 2/1996 | Kejha |
| 5,515,341 A | 5/1996 | Toda et al. |
| 5,520,630 A | 5/1996 | Daneshvar |
| 5,528,452 A | 6/1996 | Ko |
| 5,547,508 A | 8/1996 | Affinito |
| 5,548,564 A | 8/1996 | Smith |
| 5,556,700 A | 9/1996 | Kaneto et al. |
| 5,559,387 A | 9/1996 | Beurrier |
| 5,642,015 A | 6/1997 | Whitehead et al. |
| 5,755,090 A | 5/1998 | Hu |
| 5,755,909 A | 5/1998 | Gailus |
| 5,760,530 A | 6/1998 | Kolesar |
| 5,817,099 A | 10/1998 | Skolik et al. |
| 5,841,143 A | 11/1998 | Tuma et al. |
| 5,888,646 A | 3/1999 | Takahashi et al. |
| 5,891,065 A | 4/1999 | Cariapa et al. |
| 5,977,685 A | 11/1999 | Kurita et al. |
| 5,997,465 A | 12/1999 | Savage et al. |
| 6,008,580 A | 12/1999 | Nakamura et al. |
| 6,008,582 A | 12/1999 | Asano et al. |
| 6,008,583 A | 12/1999 | Breuer et al. |
| 6,108,175 A | 8/2000 | Hawwa et al. |
| 6,123,681 A | 9/2000 | Brown, III |
| RE37,065 E | 2/2001 | Grahn |
| 6,208,065 B1 | 3/2001 | Ueyama |
| 6,210,514 B1 | 4/2001 | Cheung et al. |
| 6,216,495 B1 | 4/2001 | Couzan et al. |
| 6,255,758 B1 | 7/2001 | Cabuz et al. |
| 6,282,956 B1 | 9/2001 | Okada |
| 6,343,129 B1 | 1/2002 | Pelrine et al. |
| 6,362,559 B1 | 3/2002 | Boyd |
| 6,376,971 B1 | 4/2002 | Pelrine et al. |
| 6,411,015 B1 | 6/2002 | Toda |
| 6,437,489 B1 | 8/2002 | Shinke et al. |
| 6,511,709 B1 | 1/2003 | Barnes et al. |
| 6,543,110 B1 | 4/2003 | Pelrine et al. |
| 6,545,384 B1 | 4/2003 | Pelrine et al. |
| 6,545,395 B2 | 4/2003 | Matsui et al. |
| 6,558,577 B1 | 5/2003 | Niihara et al. |
| 6,581,481 B1 | 6/2003 | Perusek |
| 6,583,533 B2 | 6/2003 | Pelrine et al. |
| 6,586,859 B2 | 7/2003 | Kornbluh et al. |
| 6,628,040 B2 | 9/2003 | Pelrine et al. |
| 6,662,658 B2 | 12/2003 | Foote |
| 6,664,718 B2 | 12/2003 | Pelrine et al. |
| 6,700,304 B1 | 3/2004 | Fuller et al. |
| 6,700,312 B2 | 3/2004 | Iizuka et al. |
| 6,707,236 B2 | 3/2004 | Pelrine et al. |
| 6,759,769 B2 | 7/2004 | Kirjavainen |
| 6,768,246 B2 | 7/2004 | Pelrine et al. |
| 6,781,284 B1 | 8/2004 | Pelrine et al. |
| 6,806,621 B2 | 10/2004 | Heim et al. |
| 6,809,462 B2 | 10/2004 | Pelrine et al. |
| 6,812,624 B1 | 11/2004 | Pei et al. |
| 6,876,135 B2 | 4/2005 | Pelrine et al. |
| 6,882,086 B2 | 4/2005 | Kornbluh et al. |
| 6,891,317 B2 | 5/2005 | Pei et al. |
| 6,911,764 B2 | 6/2005 | Pelrine et al. |
| 6,940,211 B2 | 9/2005 | Pelrine et al. |
| 7,034,432 B1 | 4/2006 | Pelrine et al. |
| 7,049,732 B2 | 5/2006 | Pei et al. |
| 7,064,472 B2 | 6/2006 | Pelrine et al. |
| 7,104,146 B2 | 9/2006 | Benslimane et al. |
| 7,198,832 B2 | 4/2007 | Burrows et al. |
| 7,211,937 B2 | 5/2007 | Kornbluh et al. |
| 7,518,284 B2 | 4/2009 | Benslimane et al. |
| 7,548,015 B2 | 6/2009 | Benslimane et al. |
| 7,573,064 B2 | 8/2009 | Benslimane et al. |
| 7,732,999 B2 * | 6/2010 | Clausen et al. ............ 310/369 |
| 7,808,163 B2 | 10/2010 | Benslimane et al. |
| 7,843,111 B2 | 11/2010 | Benslimane et al. |
| 7,880,371 B2 | 2/2011 | Benslimane et al. |
| 8,421,316 B2 | 4/2013 | Tryson et al. |
| 2001/0026165 A1 | 10/2001 | Pelrine et al. |
| 2001/0035723 A1 | 11/2001 | Pelrine et al. |
| 2002/0008445 A1 | 1/2002 | Pelrine et al. |
| 2002/0041017 A1 | 4/2002 | Hauser et al. |
| 2002/0050768 A1 | 5/2002 | Beck et al. |
| 2002/0130673 A1 | 9/2002 | Pelrine et al. |
| 2002/0175594 A1 | 11/2002 | Kornbluh et al. |
| 2002/0175598 A1 | 11/2002 | Heim et al. |
| 2002/0185937 A1 | 12/2002 | Heim et al. |
| 2003/0006669 A1 | 1/2003 | Pei et al. |
| 2003/0066741 A1 | 4/2003 | Burgess et al. |
| 2003/0067245 A1 | 4/2003 | Pelrine et al. |
| 2003/0125781 A1 | 7/2003 | Dohno et al. |
| 2003/0141473 A1 | 7/2003 | Pelrine et al. |
| 2003/0141787 A1 | 7/2003 | Pelrine et al. |
| 2003/0213960 A1 | 11/2003 | Kitagawa et al. |
| 2003/0214199 A1 | 11/2003 | Heim et al. |
| 2004/0008853 A1 | 1/2004 | Pelrine et al. |
| 2004/0012301 A1 | 1/2004 | Benslimane et al. |
| 2004/0056567 A1 | 3/2004 | Menzel |
| 2004/0068220 A1 | 4/2004 | Couvillon, Jr. et al. |
| 2004/0124738 A1 | 7/2004 | Pelrine et al. |
| 2004/0217671 A1 | 11/2004 | Rosenthal et al. |
| 2004/0232807 A1 | 11/2004 | Pelrine et al. |
| 2004/0263028 A1 | 12/2004 | Pei et al. |
| 2005/0040736 A1 | 2/2005 | Topliss et al. |
| 2005/0046313 A1 | 3/2005 | Basheer et al. |
| 2005/0089673 A1 | 4/2005 | Fleming et al. |
| 2005/0104145 A1 | 5/2005 | Benslimane et al. |
| 2005/0113892 A1 | 5/2005 | Sproul |
| 2005/0150589 A1 | 7/2005 | Amos et al. |
| 2005/0157893 A1 | 7/2005 | Pelrine et al. |
| 2006/0016275 A1 | 1/2006 | Gravesen et al. |
| 2006/0066183 A1 | 3/2006 | Benslimand et al. |
| 2006/0079824 A1 | 4/2006 | Munch-Fals et al. |
| 2006/0113878 A1 | 6/2006 | Pei et al. |

(56) References Cited

U.S. PATENT DOCUMENTS

| | | |
|---|---|---|
| 2006/0113880 A1 | 6/2006 | Pei et al. |
| 2006/0119225 A1 | 6/2006 | Heim et al. |
| 2006/0155197 A1 | 7/2006 | Kishimoto et al. |
| 2006/0158065 A1 | 7/2006 | Pelrine et al. |
| 2007/0114885 A1 | 5/2007 | Benslimane et al. |
| 2007/0116858 A1 | 5/2007 | Benslimane et al. |
| 2007/0128059 A1 | 6/2007 | Bagwell |
| 2007/0269585 A1 | 11/2007 | Benslimane et al. |
| 2007/0277356 A1 | 12/2007 | Benslimand et al. |
| 2008/0038860 A1 | 2/2008 | Benslimane et al. |
| 2008/0093954 A1 | 4/2008 | Benslimand et al. |
| 2008/0226878 A1 | 9/2008 | Benslimane et al. |
| 2008/0238258 A1 | 10/2008 | Ishiguro et al. |
| 2008/0265709 A1 | 10/2008 | Clausen et al. |
| 2009/0000597 A1 | 1/2009 | Kronberger |
| 2009/0064476 A1 | 3/2009 | Cross et al. |
| 2009/0072658 A1 | 3/2009 | Benslimane et al. |
| 2009/0130423 A1 | 5/2009 | Keady |
| 2009/0154053 A1 | 6/2009 | Biggs et al. |
| 2009/0169829 A1 | 7/2009 | Benslimane et al. |
| 2009/0239039 A1 | 9/2009 | Benslimane et al. |
| 2009/0273483 A1 | 11/2009 | Tompkins et al. |
| 2011/0018400 A1 | 1/2011 | Kato et al. |
| 2011/0116858 A1 | 5/2011 | Burrowes |
| 2011/0210344 A1 | 9/2011 | Han et al. |
| 2011/0232744 A1 | 9/2011 | Larsen et al. |
| 2012/0003427 A1 | 1/2012 | Kuroda et al. |
| 2013/0207510 A1 | 8/2013 | Poole et al. |
| 2013/0208397 A1 | 8/2013 | Benslimane |

FOREIGN PATENT DOCUMENTS

| | | |
|---|---|---|
| DE | 38 41 243 A1 | 6/1990 |
| DE | 198 26 391 A1 | 12/1999 |
| DE | 200 04 248 U1 | 7/2000 |
| DE | 100 54 247 A1 | 5/2002 |
| EP | 0 387 180 A1 | 9/1990 |
| EP | 0 421 368 A1 | 4/1991 |
| EP | 0 468 796 B1 | 1/1992 |
| EP | 0 761 188 A2 | 3/1997 |
| EP | 0 855 307 B1 | 7/1998 |
| EP | 1 323 925 B1 | 7/2003 |
| EP | 1 324 403 A1 | 7/2003 |
| EP | 1 481 738 A2 | 12/2004 |
| EP | 1 748 190 B1 | 1/2007 |
| EP | 1 919 072 A1 | 5/2008 |
| EP | 2 136 419 A2 | 12/2009 |
| FR | 2 309 833 | 11/1976 |
| FR | 2 793 937 | 11/2000 |
| GB | 2 042 256 A | 9/1980 |
| JP | 55-42474 A | 3/1980 |
| JP | 55-91299 A | 7/1980 |
| JP | 61-138651 A | 6/1986 |
| JP | 1-273372 | 11/1989 |
| JP | 04-014448 | 1/1992 |
| JP | 2001286162 A | 10/2001 |
| JP | 2002237625 A | 8/2002 |
| JP | 2005-117103 A | 4/2005 |
| JP | 2007-11206 A | 1/2007 |
| JP | 2008-205180 A | 9/2008 |
| KR | 90-1465 | 3/1990 |
| WO | 96/34701 A1 | 11/1996 |
| WO | 97/27822 A1 | 8/1997 |
| WO | 00/66970 A1 | 11/2000 |
| WO | 01/06575 A1 | 1/2001 |
| WO | 01/06579 A2 | 1/2001 |
| WO | 01/58973 A2 | 8/2001 |
| WO | 01/59852 A3 | 8/2001 |
| WO | 01/63738 A2 | 8/2001 |
| WO | 01/65615 A3 | 9/2001 |
| WO | 02/037660 A1 | 10/2002 |
| WO | 2004/079832 A2 | 9/2004 |
| WO | 2005/079187 A2 | 9/2005 |
| WO | 2005/081676 A2 | 9/2005 |
| WO | 2006/012826 A1 | 2/2006 |
| WO | 2008/052559 A2 | 5/2008 |
| WO | 2008/063590 A1 | 5/2008 |
| WO | 2008 156166 A1 | 12/2008 |

OTHER PUBLICATIONS

Shankar et al., "Mechanical and actuation behavior of electroactive nanostructured polymers", Sensors and Actuators A (2009) pp. 46-52, vol. 151, nr. 1.

Danish Search Report for PA 2012 00118 dated Sep. 14, 2012.

PCT Search Report for Serial No. PCT/DK03/00603 dated Feb. 5, 2004.

PCT Search Report for Serial No. PCT/DK03/00848 dated Mar. 25, 2004.

PCT Search Report for Serial No. PCT/DK2009/000098 dated Jul. 3, 2009.

PCT Search Report for Serial No. PCT/DK2009/000097 dated Aug. 7, 2009.

PCT Search Report for Serial No. PCT/DK2009/000131 dated Oct. 7, 2009.

Danish Search Report for Serial No. PA 2008 00757 dated Jan. 14, 2009.

U.S. Appl. No. 12/990,333, filed Apr. 26, 2011 and entitled A Power Actuated Valve.

U.S. Appl. No. 12/990,300, filed Apr. 26, 2011 and entitled A Pump Powered by a Polymer Transducer.

U.S. Appl. No. 12/996,711, filed Apr. 27, 2011 and entitled A Transducer Compromising a Composite Material and Method of Making Such a Composite Material.

Article entitled "Electrostrictive Polymer Artificial Muscle Actuators" by R. Kornbluh, et al., SRI International, Proceedings of the 1998 IEEE International Conference on Robotics & Automation, Belgium, May 1998; pp. 2147-2154.

Article entitled "Spontaneous formation of ordered structures in thin films of metals supported on an elastomeric polymer" by N. Bowden, et al., Nature, vol. 393 dated May 14, 1998; pp. 146-148.

Article "Silicone Elastomers with Controlled Surface Composition Using Argon or Hydrogen Plasma Treatment" by B. Olander, et al., Journal of Applied Polymer Science, vol. 90, 2003 Wiley Periodicals, Inc.; pp. 1378-1383.

Pelrine R. et al., Applications of Dielectric Elastomer Actuators, Proceedings of the Spie—The International Society For Optical Engineering, Spie, PO Box 10 Bellingham WA 98277-0010 USA, vol. 4329, Jan. 1, 2001, pp. 335-349, XP002381626 ISSN:0277-786X.

Publication "High-field electrostriction of elastomeric polymer dielectrics for actuation" by Roy Kornbluh et al., SRI International; SPIE vol. 3669, pp. 149-161; Mar. 1999.

Publication Micro-Electro-Mechanical Systems (MEMS)—2000 -; by R. Trujillo, et al;; Presented at 2000 ASIME International Mechanical Engineering Congress and Exposition, Nov. 5-10, 2000, Orlando, FL; pp. 709-716.

Keyes, Robert W.: "Microstructure Fabrication", May 27, 1977, Science, vol. 196, No. 4293, pp. 945-949.

Ul-Haq S. et al, Breakdown pattern identification in high temperature dielectric films using scanning electron microscopy (SEM), 2003 Annual Report Conference on Electrical Insulation and Dielectric Phenomena, 265-268, Department of Electrical and Computer Engineering, University of Windsor, Windsor, Ontario, Canada, N9B 3P4.

Jean-Mistral C. et al, Dielectric polymer: scavenging energy from human motion, Electroactive Polymer Actuators and Devices (EAPAD) 2008, edited by Yoseph Bar-Cohen Proc. of SPIE vol. 6927, 692716, (2008).

Yu M, et al, Nonlinear analysis of sensor diaphragm under initial tension, Department of Mechanical Engineering, University of Maryland, Smart structures and Materials 2005: Modeling, Signal Processing, and Control, edited by Ralph C. Smith, Proc. of SPIE vol. 5757 (SPIE, Bellingham, WA, 2005).

Article entitled "Coating Methods, Survey" by Cohen, E. D. and Gutoff, E. B. 2001. Coating Methods, Survey, Encyclopedia of Polymer Science and Technology; vol. 1 (pp. 635-670).

* cited by examiner

CAPACITIVE TRANSDUCER AND A METHOD FOR MANUFACTURING A TRANSDUCER

FIELD OF THE INVENTION

The present invention relates to a capacitive transducer of the kind having a polymer film arranged between two electrodes in the form of electrically conductive layers arranged on opposing surfaces of the polymer film. The invention further relates to a method for manufacturing such a capacitive transducer.

BACKGROUND OF THE INVENTION

Capacitive transducers have previously been provided, which comprise a thin polymer film where a first electrode, in the form of a first electrically conductive layer, is arranged on a first surface of the polymer film, and a second electrode, in the form of a second electrically conductive layer, is arranged on a second, opposite, surface of the polymer film. Thereby the electrodes form a capacitor with the polymer film arranged therein. If a potential difference is applied between the electrodes, the electrodes are attracted to each other, and the polymer film is compressed in a direction perpendicular to the electrodes, and elongated in a direction parallel to the electrodes. If the transducer is designed in a careful manner, this results in a mechanical stroke from the transducer, i.e. the electrical energy supplied to the electrodes is converted into mechanical work, i.e. the transducer acts as an actuator.

Similarly, if the electrodes are mechanically attracted to each other, and if a potential difference is then applied between the electrodes, then by mechanically decreasing the distance between the electrodes, i.e. by compressing the polymer film in a direction perpendicular to the electrodes, and elongating the polymer film in a direction parallel to the electrodes, it is possible to convert mechanical energy into electrical energy. If the transducer is designed in a careful manner, this results in mechanical work being converted into electrical energy, i.e. the transducer acts as an electrical energy generator.

Similarly, if the electrodes are pushed towards each other or pulled away from each other, the capacitance of the capacitor is changed, due to the altered distance between the electrodes. Such a mechanism can be used for sensing purpose, where any dimensional changes in the transducer can be monitored by reading resulting capacitance changes.

It is desirable to be able to manufacture such capacitive transducers in long and thin webs, preferably using suitable manufacturing techniques, including spin coating, spray coating, casting and/or roll-to-roll processes, in order to be able to mass produce the transducers in an easy and cost effective manner. The materials which have previously been selected for the polymer film have a relatively low viscosity, in the region of 1,000-100,000 mPa·s, prior to curing the polymer film, in order to allow easy handling of the polymer material in the processes described above.

When the transducer is operated in such a manner that electrical energy is transformed into mechanical work, or vice versa, the performance of the transducer depends on the strength of the electrical field applied across the polymer film of the transducer in the sense that the higher the electrical field strength achieved, the larger the elongation of the transducer, in the case that the transducer acts as an actuator, or the more electrical energy is gained, in the case that the transducer acts as a generator. However, when high electrical field strengths are applied across the polymer film, there is a risk that electrical breakdown occurs in the transducer, resulting in damage to the electrodes and/or to the polymer film. The ability of the polymer film to resist electrical breakdown is referred to as the electrical or dielectric breakdown strength. This is a material property. However, impurities, imperfections or defects in the material tend to reduce the electrical breakdown strength. When operating the transducer, the applied voltage should be kept sufficiently low to prevent that the electrical field strength applied to the capacitive transducer exceeds the electrical breakdown strength of the polymer film. Since the applied electrical field strength determines the elongation of the transducer, the maximum possible elongation, and thereby the maximum mechanical work which can be delivered by the transducer, acting as an actuator, is limited by the electrical breakdown strength of the polymer film. Similarly, the maximum possible electrical energy gained for a transducer, acting as a generator, is limited by the electrical breakdown strength of the polymer film. Thus, in some instances it may not be possible to fully utilise the maximum potential of the transducer.

SUMMARY OF THE INVENTION

It is an object of embodiments of the invention to provide a capacitive transducer in which the electrical breakdown strength is increased as compared to prior art capacitive transducers.

It is a further object of embodiments of the invention to provide a capacitive transducer which is capable of producing more mechanical work in a single stroke than prior art capacitive transducers.

It is an even further object of embodiments of the invention to provide a capacitive transducer which is capable of producing more electrical energy in a single cycle than prior art capacitive transducers.

It is an even further object of embodiments of the invention to provide a method for manufacturing a capacitive transducer, in which the resulting capacitive transducer has an electrical breakdown strength which is increased as compared to prior art capacitive transducers.

According to a first aspect the invention provides a capacitive transducer comprising:
  a polymer film having a first surface and a second surface,
  a first electrically conductive layer arranged on the first surface of the polymer film, and
  a second electrically conductive layer arranged on the second surface of the polymer film,
wherein the polymer film is at least partly made from a material having a molecular weight which is at least 21,000 g/mol.

As described above, the first electrically conductive layer forms a first electrode, and the second electrically conductive layer forms a second electrode. The polymer film is arranged between the electrodes, and thereby a capacitor is formed.

The polymer film is at least partly made from a material having a molecular weight which is at least 21,000 g/mol. Such materials normally have a relatively high viscosity, typically higher than 100,000 mPa·s, and they are therefore normally considered inappropriate for use in manufacturing processes including gravure, slot-die, spin coating, spray coating, casting or similar techniques. In particular, in order to be able to use high viscosity materials for the processes mentioned above, it is necessary to apply solvents to the material, and to include an additional process step of drying the material to remove the solvent, prior to the curing step. Moreover, most solvents require ATEX certified equipment. This is disadvantageous because it complicates the manufacturing process. Furthermore, using high viscosity materials is believed to increase the risk of introducing impurities or defects in the material, such as pinholes or air bubbles, and the skilled person would therefore believe that the use of such materials would decrease the electrical breakdown strength.

However, the inventors of the present invention have surprisingly found that polymer materials having a molecular weight which is at least 21,000 g/mol exhibit very high electrical breakdown strengths, such as above 100 V/µm. Therefore, when the polymer film of a capacitive transducer is made at least partly of such a material, it is possible to apply a larger electrical field to the transducer without risking electrical breakdown. Accordingly, the transducer is capable of delivering more mechanical work in a single stroke, or more electrical energy in a cycle, without risking damage to the transducer. In some applications this improved performance of the transducer is so advantageous that it is more important to obtain the improved performance than to maintain an easy manufacturing process. In such cases the disadvantages of the manufacturing process are traded for the improved performance.

The electrically conductive layers may preferably be made from a metal or an electrically conductive alloy, e.g. from a metal selected from a group consisting of silver, gold, copper, aluminium and nickel. Alternatively other suitable metals or electrically conductive alloys may be chosen.

The polymer film may be at least partly made from a material having a degree of polymerization which is at least 300, such as at least 500, such as between 300 and 1,000, such as between 500 and 1,000, or at least 1,000, such as at least 5,000, such as between 5,000 and 10,000. A large degree of polymerization of a polymer material implicates large molecules. A material having a high molecular weight may therefore also have a large degree of polymerization.

The polymer film may be at least partly made from a material having a $SiO_2$ filler content of at least 10% by weight, such as at least 25% by weight, such as at least 30% by weight, such as between 10% by weight and 35% by weight, such as between 25% by weight and 35% by weight, or between 30% by weight and 45% by weight. Polymer materials with a high $SiO_2$ filler content, or with a high content of pyrogenic (fumed) silica, precipitated silica, or other reinforced filler, normally have a higher tear strength than materials with a low content of such fillers. Therefore, according to this embodiment, the polymer film is expected to exhibit high tear strength.

Thus, the polymer film may be at least partly made from a material having a pyrogenic silica filler content of at least 10% by weight, such as at least 25% by weight, such as at least 30% by weight, such as between 10% by weight and 35% by weight, such as between 25% by weight and 35% by weight, or between 30% by weight and 45% by weight.

The polymer film may be at least partly made from a material comprising an additive which increases the relative permittivity or the dielectric constant of the polymer film. According to this embodiment, the polymer film, which exhibits high electrical breakdown strength, further has a high relative permittivity or dielectric constant. This allows the mechanical work or the electrical energy provided by the transducer to be increased, thereby improving the overall performance of the transducer.

The additive may, e.g., be an organic or inorganic filler, conductive or non conductive, micro-particles or nano-particles, surface treated or not treated, prepared by grafting or another suitable method. For instance, the additive may be carbon, graphite, polyaniline-based, titanium oxide, barium titanate, nanoclays, etc. It is preferred that these additives be coated with appropriate surface treatment to increase compatibility with the polymer film having high molecular weight, thus allowing for achieving very high relative permittivity while still having high electric breakdown strength.

The amount of additive in the polymer film may be at least 0.1% by weight, such as between 0.1% by weight and 30% by weight, such as between 0.2% by weight and 10% by weight.

The polymer film may be made from an elastomer. An elastomer is a polymer with the property of viscoelasticity, generally having low Young's or elastic modulus and high yield strain. Thus, an elastomer film is highly stretchable, thereby allowing elongation of the capacitive transducer in response to an applied electrical field. The elastomer may be a silicone elastomer, such as an addition curing silicone elastomer, a platinum catalysed silicone elastomer, or polydimethylsiloxane (PDMS), such as silicone elastomer made of linear polysiloxanes, polysiloxanes with at least vinyl terminations, polysiloxanes with lateral and/or end vinyl groups, etc.

The polymer film may be at least partly made from a material having a molecular weight which is at least 35,000 g/mol, such as between 35,000 g/mol and 350,000 g/mol, such as between 35,000 g/mol and 72,000 g/mol. A group of silicone elastomers known as liquid silicone rubber (LSR) have molecular weights within the interval 35,000 g/mol to 72,000 g/mol, degrees of polymerization within the interval 500 to 1000, and $SiO_2$ filler contents within the interval 25% by weight to 35% by weight. Such elastomer materials have previously been used in medico applications, such as medical tubing and wound healing items. However, these materials have previously been considered inappropriate for use in manufacturing processes such as roll-to-roll coating, spin coating, spray coating or casting, due to their high viscosity, being within the interval 100,000 mPa·s to 8,000,000 mPa·s. The inventors of the present invention have, however, surprisingly found that the breakdown strength of LSR elastomer materials is very high, typically above 100 V/µm, and even as high as approximately 160 V/µm for some materials. This makes the LSR elastomers very suitable for use in a capacitive transducer, despite the disadvantages of their high viscosity. It is further noted that in typical manufacturer technical data sheets, stated values of electrical breakdown strength for elastomers are almost equal independent of molecular weight of the elastomer.

The polymer film may be at least partly made from a material having a molecular weight which is at least 350,000 g/mol, such as between 350,000 g/mol and 720,000 g/mol. A group of solid silicone elastomers known as high temperature vulcanizing (HTV) elastomers have molecular weights within the interval 350,000 g/mol to 720,000 g/mol, degrees of polymerization within the interval 5,000 to 10,000, and $SiO_2$ filler contents within the interval 30% by weight to 45% by weight, or even higher. Such elastomers have previously been used in high voltage (HV) cables. However, these materials have even higher viscosities, being within the interval 150,000,000 mPa·s to 250,000,000 mPa·s, than the LSR elastomers, and are not flowable at all, and therefore they have previously been considered even less appropriate for use in manufacturing processes such as roll-to-roll coating, spin coating, spray coating or casting, than the LSR elastomers. The inventors of the present invention have, however, surprisingly found that the breakdown strength of HTV elastomer materials is very high, typically above 100 V/µm, and even as high as approximately 160 V/µm for some materials. This makes the HTV elastomers very suitable for use in a capacitive transducer, despite the disadvantages of their very high viscosity.

The first surface of the polymer film and/or the second surface of the polymer film may comprise a surface pattern of raised and depressed surface portions, and the first electrically conductive layer and/or the second electrically conductive layer may be deposited onto the surface pattern of the first and/or second surface, the first electrically conductive layer and/or second electrically conductive layer thereby having a corrugated shape.

Providing one or both of the electrically conductive layers with a corrugated shape in the manner described above, allows elongation of the capacitive transducer, without having to stretch the electrode(s) formed by the electrically conductive layer(s). Instead, the corrugated shape of the electrically conductive layer(s) is simply substantially evened out while the polymer film stretches. Thus, the electrode(s) is/are compliant. Thereby the mechanical work obtained in a single stroke or electrical energy gained per cycle of the capacitive transducer is significantly increased as compared to transducers having flat electrodes.

It is particularly advantageous to use polymer films made at least partly from a material having a molecular weight which is at least 21,000 g/mol in capacitive transducers with corrugated electrodes. As described above, such transducers are capable of delivering very large mechanical work in a single stroke or high electrical energy gain per cycle due to the compliant electrode(s). In order to obtain the high mechanical work or electrical energy levels, it is necessary to apply a high electrical field strength to the transducer. Therefore it is desirable that the polymer film is made from a material having a high electrical breakdown strength, in order to avoid electrical breakdown when the transducer is operated in such a manner that its full potential is used. As described above, the inventors of the present invention have surprisingly found that polymer materials having a high molecular weight exhibit a high electrical breakdown strength, and therefore they are particularly advantageous in this case.

The raised and depressed surface portions of the first and/or second surface may have a shape and/or size which vary periodically along at least one direction of the respective surface. According to this embodiment, the corrugated electrically conductive layer is compliant along a first direction, but relatively stiff along a second, substantially perpendicular, direction. Thereby an anisotropically compliant electrode is provided. This allows the direction of the mechanical stroke or elongation of the transducer to be controlled. Thereby the mechanical energy delivered by the transducer or the electrical energy gained can be utilised more efficiently.

The variations of the raised and depressed surface portions may be relatively macroscopic and easily detected by the naked eye of a human being, and they may be the result of a deliberate act by the manufacturer. The periodic variations may include marks or imprints caused by one or more joints formed on a roller used for manufacturing the film. Alternatively or additionally, the periodic variations may occur on a substantially microscopic scale. In this case, the periodic variations may be of the order of magnitude of manufacturing tolerances of the tool, such as a roller, used during manufacture of the film. Even if it is intended and attempted to provide a perfect roller, having a perfect pattern, there will in practice always be small variations in the pattern defined by the roller due to manufacturing tolerances. Regardless of how small such variations are, they will cause periodical variations to occur on a film being produced by repeatedly using the roller. In this way the film may have two kinds of periodic variations, a first being the imprinted surface pattern of structures such as corrugations being shaped perpendicular to the film, this could be called a sub-pattern of variations, and further due to the repeated imprinting of the same roller or a negative plate for imprinting, a super-pattern may arise of repeated sub-patterns.

The surface pattern may comprise waves forming troughs and crests extending in essentially one common direction, each wave defining a height being a shortest distance between a crest and neighbouring troughs. According to this embodiment, the crests and troughs resemble standing waves with essentially parallel wave fronts. However, the waves are not necessarily sinusoidal, but could have any suitable shape as long as crests and troughs are defined. According to this embodiment a crest (or a trough) will define substantially linear contour-lines, i.e. lines along a portion of the corrugation with equal height relative to the polymer film in general. This at least substantially linear line will be at least substantially parallel to similar contour lines formed by other crest and troughs, and the directions of the at least substantially linear lines define the common direction. The common direction defined in this manner has the consequence that anisotropy occurs, and an electrically conductive layer arranged on the corrugated surface is compliant in a direction perpendicular to the common direction.

An average height of the waves may be between 1/3 and 20 µm, such as between 1 µm and 15 µm, such as between 2 µm and 10 µm, such as between 4 µm and 8 µm.

The first electrically conductive layer and/or the second electrically conductive layer may have a thickness in the range of 0.01-0.2 µm, such as in the range of 0.01-0.1 µm, such as in the range of 0.1-0.2 µm, such as in the range of 0.02 µm to 0.09 µm, such as in the range of 0.05 µm to 0.07 µm. Thus, the electrically conductive layer is preferably applied to the film in a very thin layer. This facilitates good performance and facilitates that the electrically conductive layer can follow the corrugated pattern of the surface of the film upon deflection.

The polymer film may be a structure comprising at least two layers of polymer material, wherein at least a first of the layers of polymer material is made from a material having a molecular weight which is at least 21,000 g/mol, and at least a second of the layers of polymer material is made from a material having a molecular weight which is between 7,000 g/mol and 21,000 g/mol. According to this embodiment, the first of the layers of polymer material has a high molecular weight, and thereby a high electrical breakdown strength and a high viscosity. On the other hand, the second of the layers of polymer material has a low molecular weight, corresponding to the polymer materials which are normally used for capacitive transducers, and thereby a lower electrical breakdown strength and a lower viscosity. Thus, the first layer ensures that the polymer film has a required high electrical breakdown strength, while the second layer is easier to handle during manufacture, due to the lower viscosity. Accordingly, the second layer may advantageously form a part of the polymer film which requires careful handling during manufacture, such as a part having an electrically conductive layer arranged thereon, and/or a part being provided with a surface pattern, such as a corrugated surface pattern. The first layer may form a part of the polymer film which does not require such careful handling during manufacture.

The polymer film may be a structure comprising at least three layers of polymer material, wherein at least a first of the layers of polymer material is made from a material having a molecular weight which is at least 21,000 g/mol, at least a second of the layers of polymer material is made from a material having a molecular weight which is between 7,000 g/mol and 21,000 g/mol, and at least a third of the layers of polymer material is made from a material having a molecular weight which is between 7,000 g/mol and 21,000 g/mol, and wherein the first layer is arranged between the second layer and the third layer. According to this embodiment, a layer of polymer material which has a high molecular weight, and thereby a high electrical breakdown strength and a high viscosity, is arranged between two layer of polymer material which have a low molecular weight, and thereby a lower electrical breakdown strength and a low viscosity. In this case the first surface of the polymer film and the second surface of the polymer film may both be made from the low viscosity polymer material, and they are therefore easy to handle during manufacture. This means that any surface patterns, such as corrugations, as well as deposition of electrically conductive layers, including any required surface treatment, can be performed in a polymer material which is well known for the purpose and suitable for the appropriate manufacturing processes. Simultaneously, the second layer arranged between the first layer and the third layer forms a barrier layer which provides the desired high electrical breakdown strength to the structure.

The second of the layers of polymer material may preferably be one of the kinds of material described above, such as an LSR elastomer or a HTV elastomer. For instance, at least the second of the layers of polymer material may be made from a material having a degree of polymerization which is at least 300, such as at least 500, such as between 500 and 1,000.

According to a second aspect the invention provides a method for manufacturing a capacitive transducer, the method comprising the steps of:
providing a polymer film having a first surface and a second surface,
depositing a first electrically conductive layer on the first surface of the polymer film, and
depositing a second electrically conductive layer on the second surface of the polymer film,
wherein the step of providing a polymer film comprises providing a polymer film which is at least partly made from a material having a molecular weight which is at least 21,000 g/mol.

The transducer which is manufactured by means of the method according to the second aspect of the invention may preferably be a transducer according to the first aspect of the invention. Therefore the remarks set forth above are equally applicable here. In particular, since the polymer film is at least partly made from a material having a molecular weight which is at least 21,000 g/mol, the polymer film exhibits a high electrical breakdown strength, and thereby it is possible to increase the obtained performance of the transducer, as described above.

The step of providing a polymer film may comprise adding a solvent to a polymer material. As described above, polymer materials having high molecular weights often have a high viscosity. Therefore, in order to handle the polymer film, e.g. in order to produce a thin polymer film, possibly with corrugated surfaces, it may be necessary to add a solvent to the polymer material, thereby decreasing the viscosity of the material.

Alternatively or additionally, the step of providing a polymer film may comprise the steps of:
providing a polymer material,
providing a curing agent,
mixing the polymer material and the curing agent, thereby obtaining a polymer mixture,
forming a polymer film from the polymer mixture, and allowing the polymer film to cure.

According to this embodiment, the polymer film is shaped after the curing agent has been added to the polymer material, but before the polymer mixture cures. This allows handling of the polymer material. Once the polymer film has cured, the shape of the polymer film is maintained. The curing agent may be of a kind which causes the polymer film to cure when a specific time interval has lapsed after mixing the polymer material and the curing agent. In this case the curing step simply takes place after the specific time interval has lapsed. Alternatively, the curing agent may be of a kind which requires activation, such as heat activation, before curing of the polymer film takes place. In this case the step of allowing the polymer film to cure comprises the step of activating the curing agent, e.g. heating the polymer film to a relevant curing temperature in the case that the curing agent requires heat activation.

The method may further comprise the steps of:
adding a solvent to the polymer material, and
adding a solvent to the curing agent,
wherein said steps are performed prior to mixing the polymer material and the curing agent.

According to this embodiment, solvent is added to the polymer material as well as to the curing agent. The mixture of polymer material and solvent is then mixed with the mixture of curing agent and solvent, thereby obtaining the polymer mixture. Since adding solvent decreases the viscosity of the polymer material and of the curing agent, respectively, it becomes easier to properly mix the polymer material and the curing agent. Thereby it is easier to obtain a uniform polymer mixture.

As an alternative, solvent may only be added to the polymer material or only to the curing agent. This may be relevant if only one of these materials has a high viscosity.

As another alternative, the polymer material and the curing agent may be mixed first, and solvent may be added to the polymer mixture before the polymer film is formed.

As described above, the polymer film may advantageously be made from an elastomer, such as a silicone elastomer. A silicone elastomer typically comprises a silicone base, a filler, a catalyst, e.g. platinum, tin or another suitable catalyst, and a cross-linker. Furthermore, the silicone elastomer may comprise other ingredients, such as pigments, stabilizers, silicone oil, etc.

Some silicone elastomers are of a two-component type, i.e. a component A is mixed with a component B, and the mixture is allowed to cure when the elastomer film has been formed. For instance, component A may be a silicone base, while component B may be a curing agent. In this case the filler may be added to component A, to component B, or to both. The same applies to pigments and/or silicone oil. The cross-linker may be added to component A, while the catalyst is added to component B. Alternatively, the cross-linker may be added to component B, while the catalyst is added to component A. However, the cross-linker and the catalyst must not both be added to component A or to component B, since this may lead to partial curing of said component. However, when the cross-linker and the catalyst are added to separate components, the catalyst will activate the cross-linker when component A and component B are mixed, and thereby curing is allowed to take place after the mixing, but not before. Thus, in this case component A may be or act as a silicone base, while component B may be or act as a curing agent, or vice versa.

The step of providing a polymer film may comprise providing the first surface of the polymer film and/or the second surface of the polymer film with a surface pattern of raised and depressed surface portions. As described above, a corrugated surface is thereby obtained, onto which the layer of electrically conductive material is deposited. Thereby a compliant electrode is obtained, which allows a long elongation of the transducer in response to an electrical or mechanical excitation of the transducer.

The surface pattern may, e.g., be provided by means of a shape defining element, e.g. in the form of a roller or a mould, which is used for imprinting the surface pattern onto a surface of the polymer film.

The step of providing a polymer film may comprise the steps of:
  providing a first layer of polymer material,
  allowing said first layer of polymer material to cure,
  applying a second layer of polymer material onto a surface of said first layer of polymer material, and
  allowing said second layer of polymer material to cure.

According to this embodiment, the resulting polymer film is a multi-layered structure. The multi-layered structure is gradually built up by applying a new layer onto an already cured layer, and then allowing the newly applied layer to cure.

The step of providing a polymer film may further comprise the steps of:
  providing a third layer of polymer material onto a surface of the second layer of polymer material or onto a surface of the first layer of polymer material, and
  allowing said third layer of polymer material to cure.

According to this embodiment, an additional layer of polymer material is added to the multi-layered structure. In principle, the procedure could be repeated as many times as required in order to obtain a desired multi-layered structure. Thus, a fourth, fifth, sixth, etc., layer may be added to the structure in a sequential manner, allowing each layer to cure before the next layer is applied. The material of the first layer of polymer material may differ from the material of the second layer of polymer material. According to this embodiment, the material of one layer may have a low molecular weight and thereby a low electrical breakdown strength, but a low viscosity, thereby allowing easy handling of this layer during manufacture. The other layer may have a high molecular weight and thereby a high electrical breakdown strength, but a high viscosity, thereby making handling of this layer during manufacture more difficult. Thereby it is obtained that certain parts of the resulting multi-layered structure can be handled easily during manufacture, while other parts of the multi-layered structure ensure a desired high electrical breakdown strength.

According to an alternative embodiment, a polymer film in the form of a multi-layered structure may be obtained by shaping and curing the individual layers, and subsequently attaching the layers to each other, e.g. by laminating the layers together. According to this embodiment, the first and second layers of electrically conductive material may be deposited onto the relevant surfaces before the layers are attached to each other. For instance, two substantially identical layers of polymer material may be formed from any suitable polymer material exhibiting desired viscosity properties, but without considering the properties regarding electrical breakdown strength of the polymer material. A layer of electrically conductive material is deposited onto a surface of each of the two polymer layers. The surfaces onto which the electrically conductive material is deposited may be provided with a surface pattern prior to depositing the layers of electrically conductive material, as described above. An additional layer of polymer material may then be formed from a polymer material which exhibits desired properties with respect to electrical breakdown strength, i.e. a polymer material having a high molecular weight, but without considering the viscosity properties of the polymer material. The additional layer of polymer material is not provided with surface patterns, and no layer of electrically conductive material is deposited on a surface of the additional layer. Finally, the three layers are attached to each other in such a manner that the additional layer is arranged between the two layers carrying the layers of electrically conductive material, and in such a manner that the layers of electrically conductive material form outer surfaces of the resulting structure. Such a laminated structure is sometimes referred to as a back-to-back structure.

As an alternative, the first and second layers of electrically conductive material may be deposited onto first and second surfaces of a multi-layered structure after the layers have been attached to each other.

As another alternative, the layers may be laminated together in such a manner that one or more of the electrically conductive layers are arranged inside the laminated structure. For instance, two layers, each being provided with an electrically conductive layer, may be laminated together in such a manner that the electrically conductive layer of one layer faces a surface of the other layer which is not provided with an electrically conductive layer. Such a laminated structure is sometimes referred to as a front-to-back structure.

BRIEF DESCRIPTION OF THE DRAWINGS

The invention will now be described in further detail with reference to the accompanying drawings in which.

DETAILED DESCRIPTION OF THE PREFERRED EMBODIMENTS

Figure 1A:
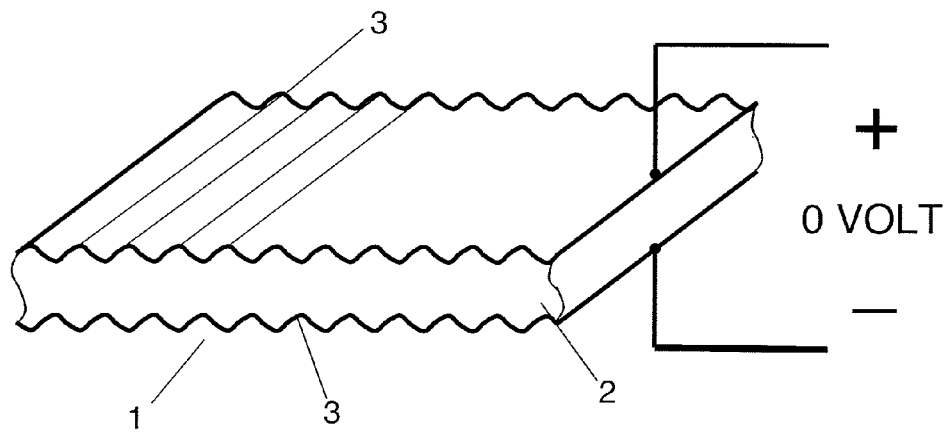
FIGS. 1a and 1b show a capacitive transducer according to an embodiment of the invention being exposed to zero electrical potential difference and being exposed to a high electrical potential difference, respectively.
Figure 1B:
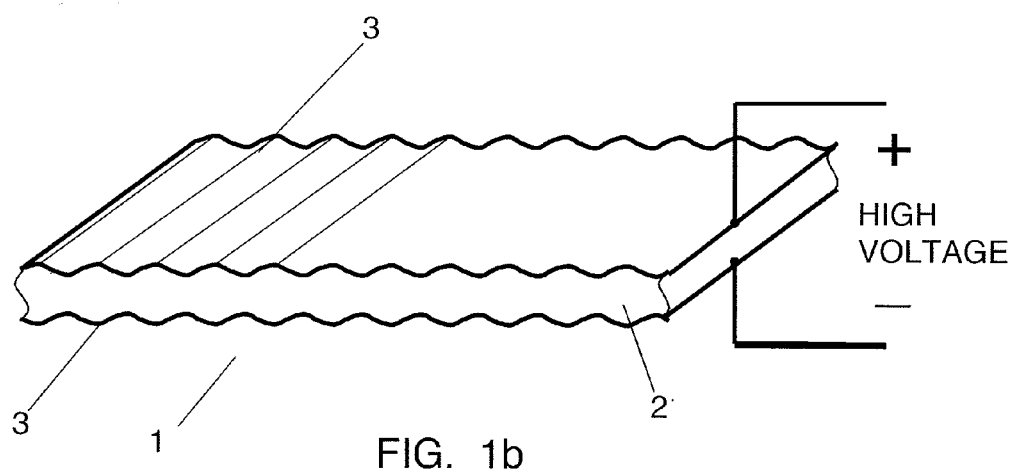

FIGS. 1a and 1b show a capacitive transducer 1 according to an embodiment of the invention. The capacitive transducer 1 comprises a polymer film 2 having a first surface and a second surface. The surfaces are both provided with a surface pattern of raised and depressed surface portions. The raised and depressed surface portions form waves of crests and troughs, extending in one common direction.

An electrically conductive layer 3 is deposited onto each of the surfaces of the polymer film 2, the electrically conductive material being deposited so that the electrically conductive layers 3 are formed according to the pattern of raised and depressed surface portions. Thereby a designed corrugated profile of the electrically conductive layers 3 is obtained.

The electrically conductive layers 3 form electrodes of the transducer 1, and they are electrically connected to a power source. In FIG. 1a the electrically conductive layers 3 are exposed to zero electric potential difference, and in FIG. 1b the electrically conductive layers 3 are exposed to a high electric potential difference. When the electrically conductive layers 3 are exposed to a high electric potential difference, the electrically conductive layers 3 are attracted to each other. Thereby the thickness of the polymer film 2 arranged between the electrically conductive layers 3 is reduced, and the polymer film 2 is stretched, i.e. elongated, along a direction which is perpendicular to the common direction of the waves defined by the surface pattern. The elongation of the polymer film 2 causes the waves of the surface pattern to substantially even out. Since the electrically conductive layers 3 follow the surface pattern, the crests and troughs of the electrically conductive layers 3 are also substantially evened out when the polymer film 2 is elongated. Accordingly, the electrodes defined by the electrically conductive layers 3 are compliant, thereby allowing substantial elongation of the polymer film 2 without risking damage to the electrically conductive layers 3.

Figure 2:
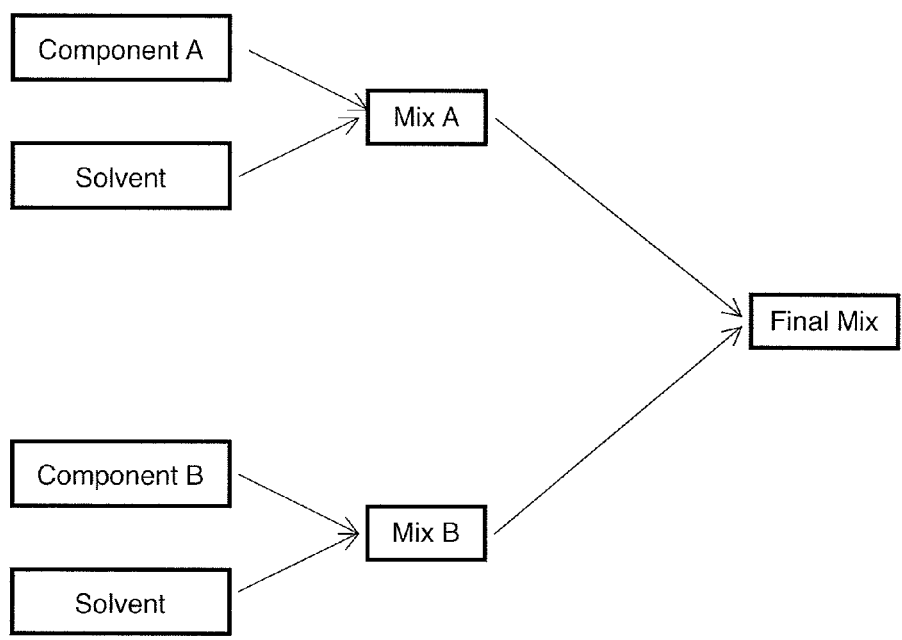
FIG. 2 illustrates a mixing process forming part of a method according to an embodiment of the invention.

FIG. 2 illustrates a mixing process forming part of a method according to an embodiment of the invention. A component A, in the form of a polymer material, is mixed with a solvent to form a mixture, Mix A. Thereby the viscosity of the polymer material is decreased. Furthermore, a component B, in the form of a curing agent, is mixed with a solvent to form a mixture, Mix B. Thereby the viscosity of the curing agent is also decreased. Finally, the two mixtures, Mix A and Mix B, are mixed to form a final mixture, Final Mix. The decreased viscosity of the polymer material and of the curing agent makes it easier to obtain a uniform final mixture.

The final mixture may subsequently be used for forming a polymer film in a manner which will be described in further detail below. Since the two mixtures, Mix A and Mix B, both contain solvent, the final mixture, Final Mix, also contains solvent. Thereby the viscosity of the final mixture is lower than would be the case if solvent had not been added, and easy handling of the final mixture is ensured.

Figure 3:
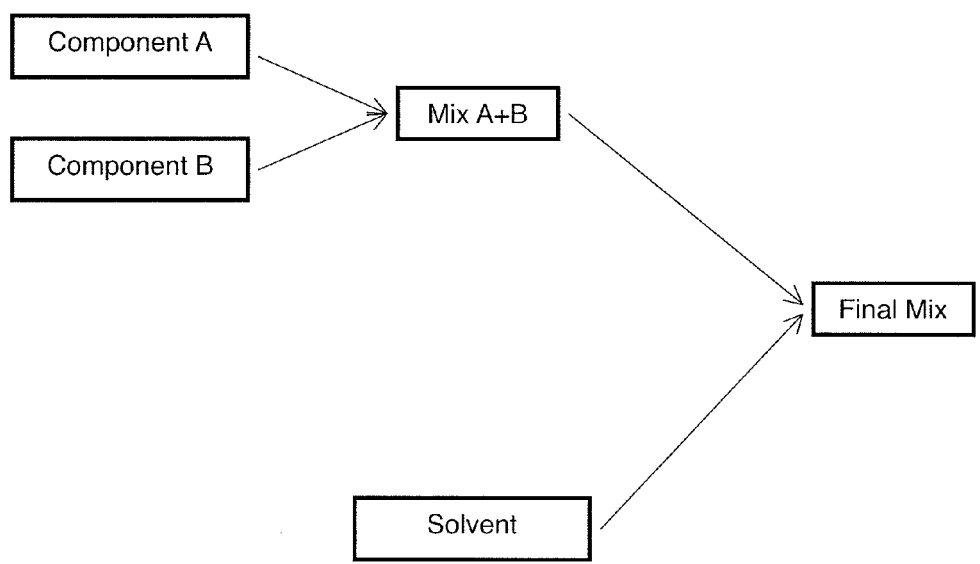
FIG. 3 illustrates an alternative mixing process forming part of a method according to an alternative embodiment of the invention.

FIG. 3 illustrates a mixing process forming part of a method according to an alternative embodiment of the invention. A component A, in the form of a polymer material, is mixed with a component B, in the form of a curing agent, to form a mixture, Mix A+B. Next, the mixture, Mix A+B is mixed with a solvent to form a final mixture, Final Mix. Similarly to the process illustrated in FIG. 2, the viscosity of the final mixture is reduced, due to the added solvent, thereby ensuring easy handling of the final mixture.

The final mixture may subsequently be used for forming a polymer film in a manner which will be described in further detail below.

Figure 4:
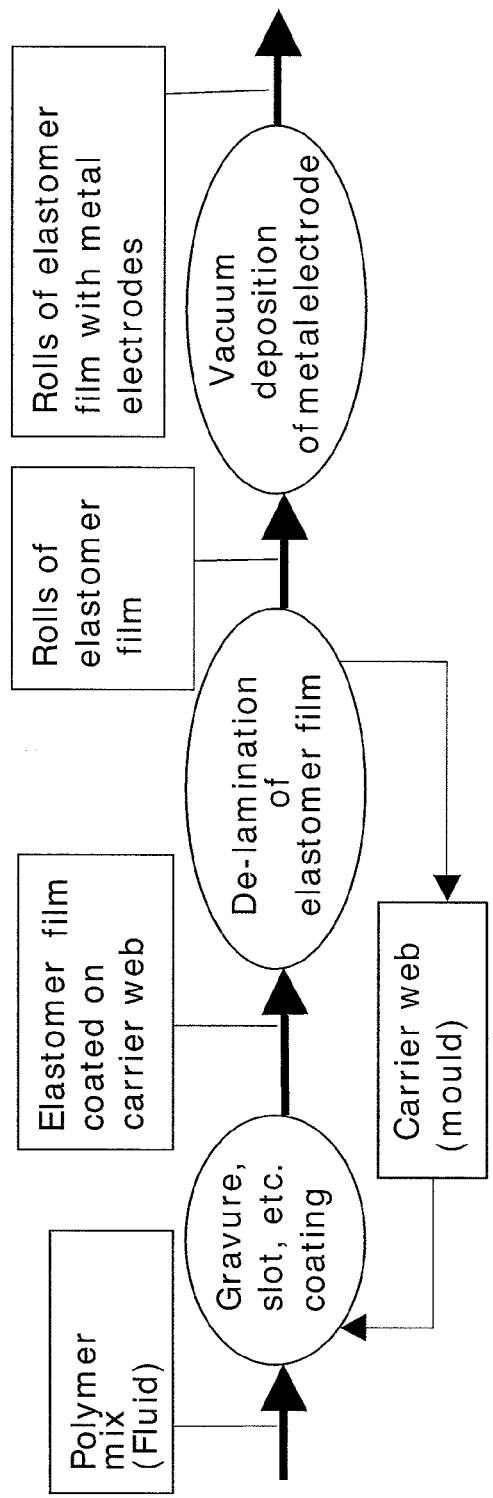
FIGS. 4-6 are flow diagrams illustrating method steps of methods according to various embodiments of the invention.

FIG. 4 is a flow diagram illustrating method steps of a method according to an embodiment of the invention. A polymer mixture is provided. The polymer mixture may, e.g., be provided in a manner described above with reference to FIG. 2 or FIG. 3. The polymer mixture is coated onto a shape defining element in the form of a mould or carrier web, using a suitable coating technique, such as gravure coating, slot coating, spin coating, or other similar techniques. The carrier Web may advantageously be provided with a surface pattern, which is imprinted onto the polymer mixture as the polymer mixture is coated onto the carrier web. The polymer mixture is allowed to cure, and as a result, an elastomer film, coated onto the carrier web, is obtained.

The elastomer film is then de-laminated from the carrier web. The carrier web is returned, and polymer mixture is once again coated onto the carrier web. The carrier web may be or form part of a roller. This process results in a long web of elastomer film. In the case that the carrier web is provided with a surface pattern, the elastomer film is also provided with a surface pattern, which is an imprint of the surface pattern of the carrier web. The de-laminated elastomer film is rolled up, and a roll of elastomer film is thereby obtained.

Next, the elastomer film is supplied to a vacuum deposition chamber, where a metal layer is deposited onto a surface of the elastomer film. Thereby an electrode is formed on the surface of the elastomer film. In the case that the surface is provided with a surface pattern as described above, the deposited metal layer follows the surface pattern, and the resulting electrode is compliant.

Finally, the elastomer film with the metal electrodes is rolled up, thereby obtaining rolls of elastomer film with metal electrodes.

Figure 5:
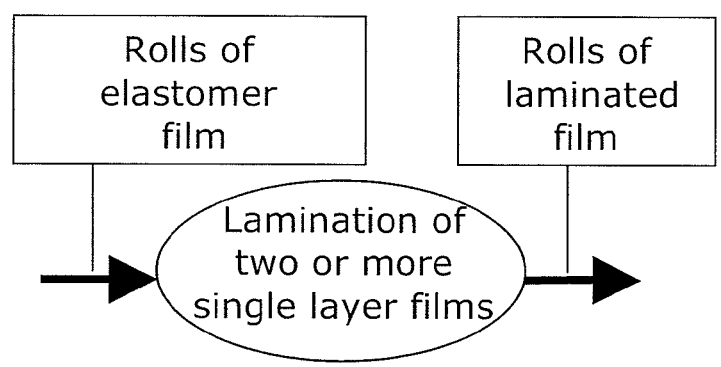

FIG. 5 is a flow diagram illustrating method steps of a method according to an embodiment of the invention. Rolls of elastomer film are provided. One or more of the rolls of elastomer film may be provided with a metal electrode deposited onto a surface of the elastomer film. In this case, the elastomer film may be manufactured in the manner described above with reference to FIG. 4. However, one or more of the elastomer films may be of a kind which is not provided with a metal electrode.

Two or more layers of elastomer film are laminated together, using a suitable lamination technique, thereby obtaining rolls of laminated film. In the case that one or more of the elastomer films is/are provided with a metal electrode, deposited onto at least one surface of the elastomer film, the lamination process may be performed in such a manner that surfaces being provided with a metal electrode form outer surfaces of the laminate. Thereby the resulting laminated structure forms a capacitive transducer comprising metal electrodes arranged with a multi-layered elastomer film there between. Such a structure is sometimes referred to as a back-to-back laminate. As an alternative, the lamination process may be performed in such a manner that one or more metal electrodes is/are arranged inside the laminated structure. This may, e.g., be obtained by arranging a metal electrode of one layer in such a manner that it faces a surface of another layer which is not provided with a metal electrode. Such a structure is sometimes referred to as a front-to-back laminate.

The layers of elastomer film may be made from the same polymer material. However, the layers may alternatively be made from different polymer materials exhibiting different properties. For instance, some layers may be made from a polymer material with a low viscosity in order to allow easy handling of these layers, while other layers may be made from a polymer material with a high molecular weight, and thereby a high electrical breakdown strength, in order to ensure that the laminated film has a high electrical breakdown strength. According to one embodiment, the laminated film may comprise two layers being provided with a metal electrode arranged on a surface being provided with a surface pattern. These two layers may advantageously be made from a polymer material with low viscosity, thereby allowing easy handling, in particular with respect to providing the surface pattern. Furthermore, the laminated film may comprise an additional layer arranged between the two layers described above. The additional layer may be made from a polymer material with a high molecular weight, and thereby a high electrical breakdown strength. The metal layers form outer surfaces of the laminated structure. Thereby a capacitive transducer with a high electrical breakdown strength is provided.

Figure 6:
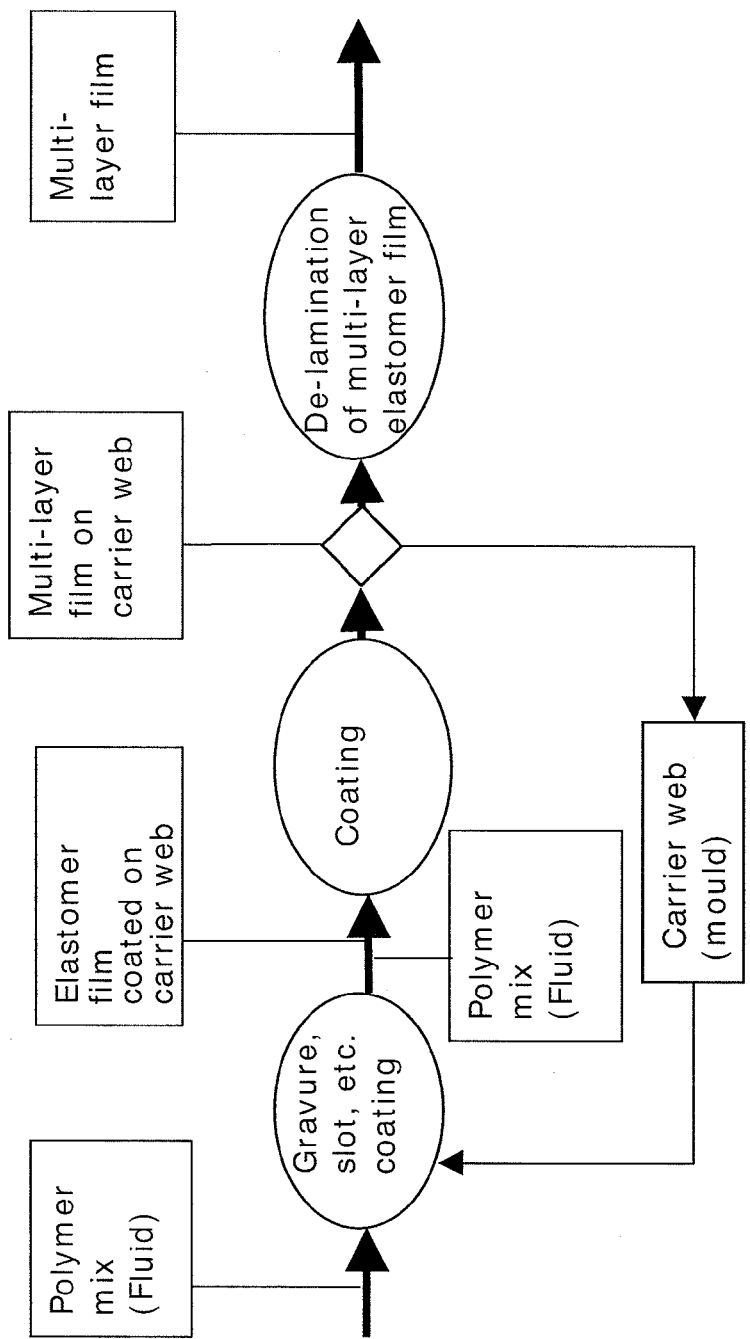

FIG. 6 is a flow diagram illustrating method steps of a method according to an alternative embodiment of the invention. Similarly to the process described above with reference to FIG. 4, a polymer mixture is coated onto a shape defining element in the form of a mould or carrier web and allowed to cure, thereby obtaining an elastomer film attached to a carrier web.

Next, polymer mixture is coated onto the elastomer film attached to the carrier web. The polymer mixture may be the same kind of polymer mixture which was used for forming the first elastomer film. Alternatively, another kind of polymer mixture may be used, e.g. a polymer mixture with properties which differ from the properties of the first polymer mixture. Thereby an additional polymer layer is added to the elastomer film. The additional layer is allowed to cure, and thereby an elastomer film comprising two layers is formed. The process may be repeated until a multi-layered structure comprising a desired number of layers has been obtained. Such multi-layer structures can then be de-laminated from the carrier web, thereby obtaining rolls of multi-layer elastomer film.

Figure 7A:
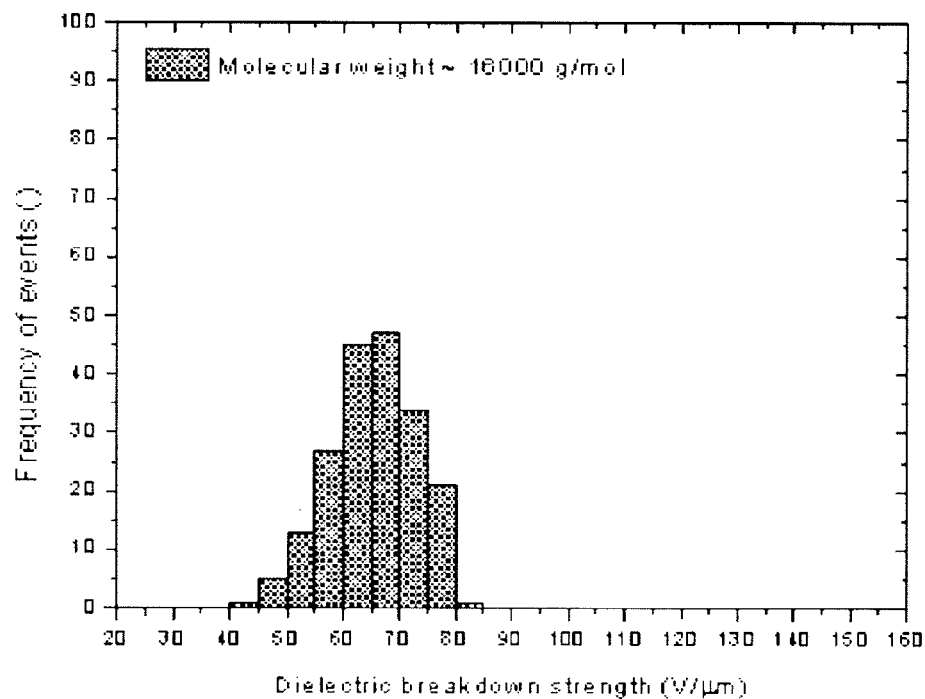
FIGS. 7a and 7b are graphs illustrating performance of a prior art capacitive transducer.
Figure 7B:
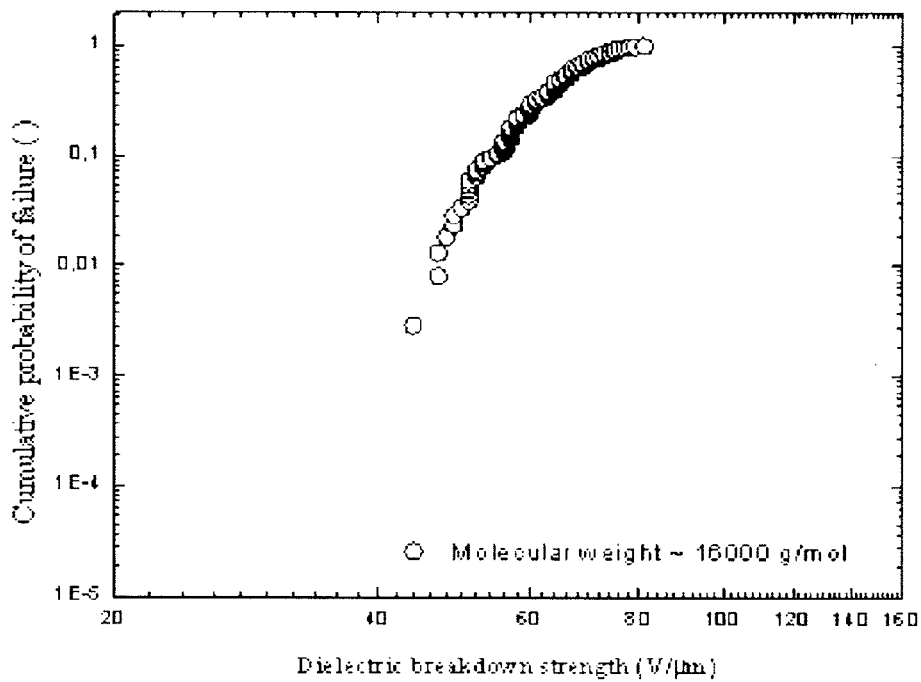

FIGS. 7a and 7b illustrate electrical breakdown strength of a polymer material which has previously been used for capacitive transducers. FIG. 7a shows number of breakdown events as a function of applied electrical field strength, and FIG. 7b shows cumulative probability of failure, due to electrical breakdown, as a function of applied electrical field strength. The tested polymer material has a molecular weight of approximately 16,000 g/mol, and belongs to a group of silicone elastomers which is sometimes referred to as room temperature vulcanizing (RTV-2) elastomers. These elastomers have relatively low viscosities, and are therefore easy to handle during manufacture. For this reason it has previously been preferred to use these elastomers for capacitive transducers where a thin layer of elastomer is arranged between electrically conductive layers.

Figure 8A:
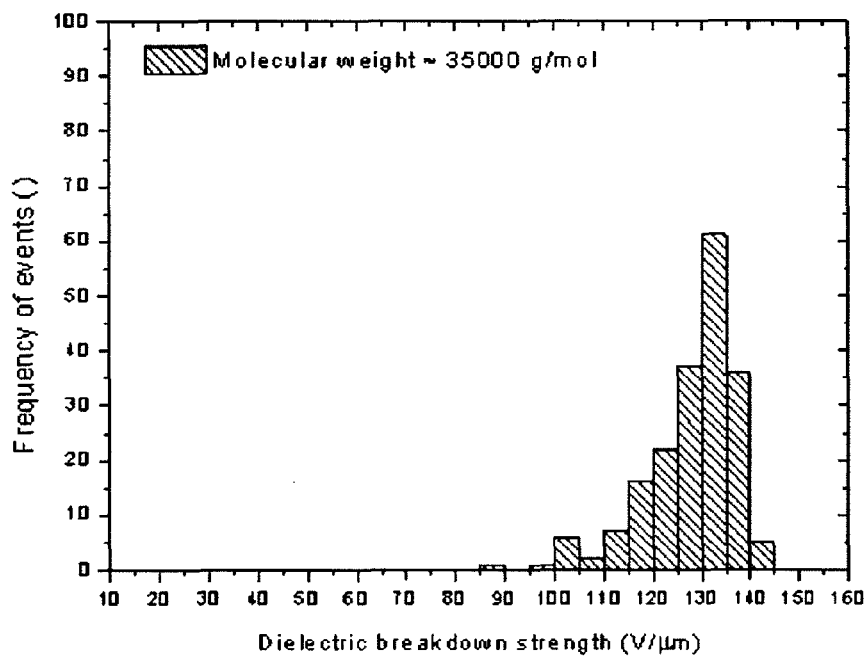
FIGS. 8a and 8b are graphs illustrating performance of a capacitive transducer according to an embodiment of the invention.
Figure 8B:
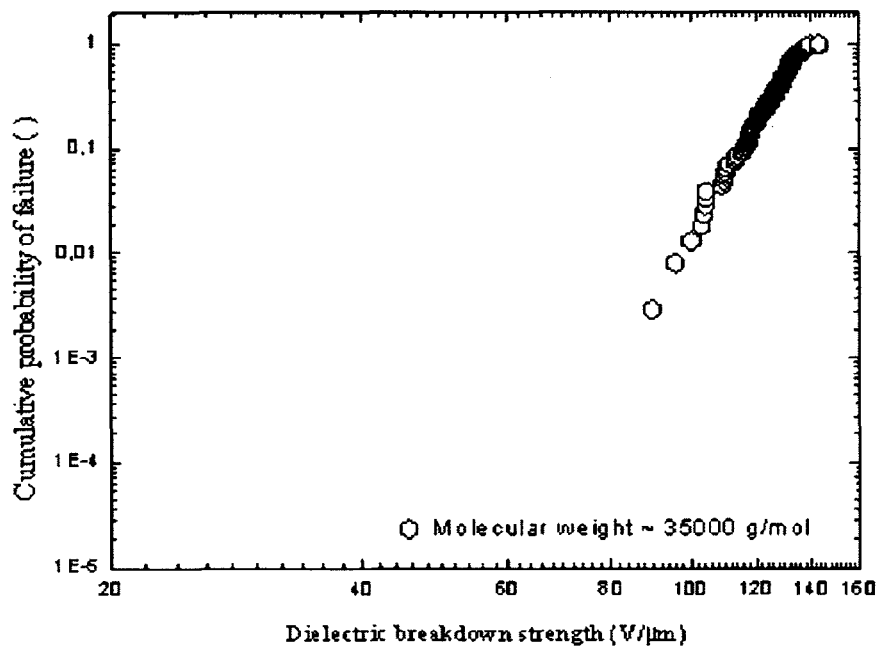

FIGS. 8a and 8b show graphs which are similar to the graphs of FIGS. 7a and 7b. However, the material being tested has a molecular weight of approximately 35,000 g/mol, i.e. significantly higher than the material which was tested in FIGS. 7a and 7b. The polymer material which was tested in FIGS. 8a and 8b belongs to a group of silicone elastomers which is sometimes referred to as liquid silicone rubbers (LSR). These materials have previously been used for medical purposes, such as for medical tubing or wound healing applications.

Comparing FIGS. 7a and 7b to FIGS. 8a and 8b, it is clear that a typical electrical breakdown strength for elastomer films made from the LSR elastomer is significantly higher than a typical electrical breakdown strength for elastomer films made from the RTV-2 elastomer, even though technical data sheets from manufacturers state similar electrical breakdown strength to that of RTV-2 elastomers. More particularly, it can be seen that electrical breakdown typically occurs for the RTV-2 elastomer film, illustrated in FIGS. 7a and 7b, at approximately 65 V/µm, while electrical breakdown typically occurs for the LSR elastomer film, illustrated in FIGS. 8a and 8b, at approximately 135 V/µm. Thus, using the LSR elastomer film in a capacitive transducer allows a significantly higher electrical field to be applied to the transducer without risking electrical breakdown of the transducer, i.e. the performance of the transducer is significantly improved.

Figure 9:
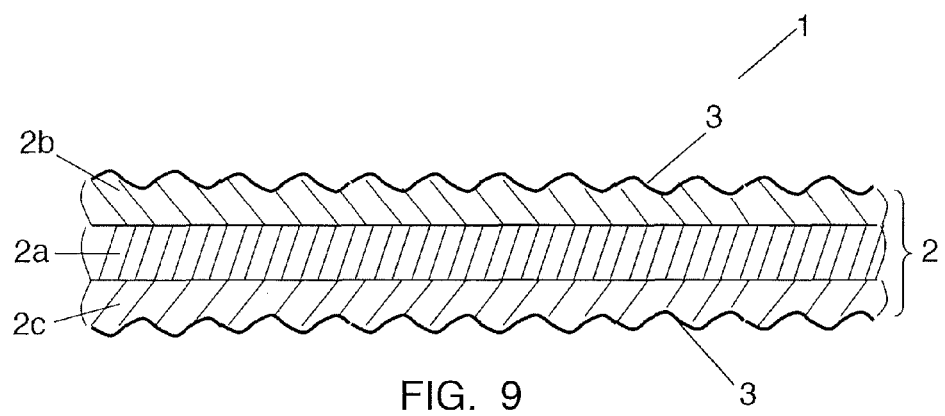
FIG. 9 is a cross sectional view of a capacitive transducer according to an embodiment of the invention.

FIG. 9 is a cross sectional view of a capacitive transducer 1 according to an embodiment of the invention. Similarly to the embodiment shown in FIGS. 1a and 1b, the capacitive transducer 1 of FIG. 9 comprises an elastomer film 2 comprising a first surface and a second surface, each surface being provided with a surface pattern of raised and depressed surface portions. An electrically conductive layer 3 is deposited onto each of the surfaces of the elastomer film 2.

The elastomer film 2 is a multi-layer structure comprising three layers. A first layer 2a is arranged in a centre part of the elastomer film 2, while a second layer 2b and a third layer 2c are arranged adjacent to the first layer 2a, and at opposing sides of the first layer 2a. The second layer 2b and the third layer 2c comprise the surfaces being provided with the surface pattern and having the electrically conductive layers 3 deposited thereon.

The first layer 2a is made from a polymer material which has a molecular weight which is at least 21,000 g/mol. The material may, e.g., be a liquid silicone rubber (LSR). Thereby the first layer 2a exhibits high electrical breakdown strength, as described above, and accordingly the elastomer film 2 exhibits high electrical breakdown strength. The second layer 2b and the third layer 2c are both made from a material which differs from the material of the first layer 2a. The second layer 2b and the third layer 2c may be made from the same material, or they may be made from different materials, in which case the three layers 2a, 2b, 2c of the elastomer film 2 is made from three different materials.

The material(s) of the second layer 2b and the third layer 2c may advantageously be selected to exhibit low viscosity prior to curing, thereby making it easy to handle the second layer 2b and the third layer 2c during manufacture of the capacitive transducer 1. Thus, in the embodiment shown in FIG. 9, the first layer 2a of the elastomer film 2 acts as a barrier layer, providing the desired high electrical breakdown strength to the elastomer film 2. Simultaneously, the second layer 2b and the third layer 2c, which form the part of the elastomer film 2 which is difficult to manufacture, are easy to handle, due to the low viscosity of the material used for these layers 2b, 2c.

In the capacitive transducer 1 of FIG. 9 the electrically conductive layers 3 are arranged on outer surfaces of the elastomer film 2. Thus, the capacitive transducer 1 of FIG. 9 is a back-to-back multi-layer structure. The layers 2a, 2b, 2c of the elastomer film 2 may be manufactured separately and subsequently laminated together. As an alternative, the elastomer film 2 may be manufactured by sequentially adding layers to the structure and allowing each layer to cure before the next layer is added.

Figure 10:
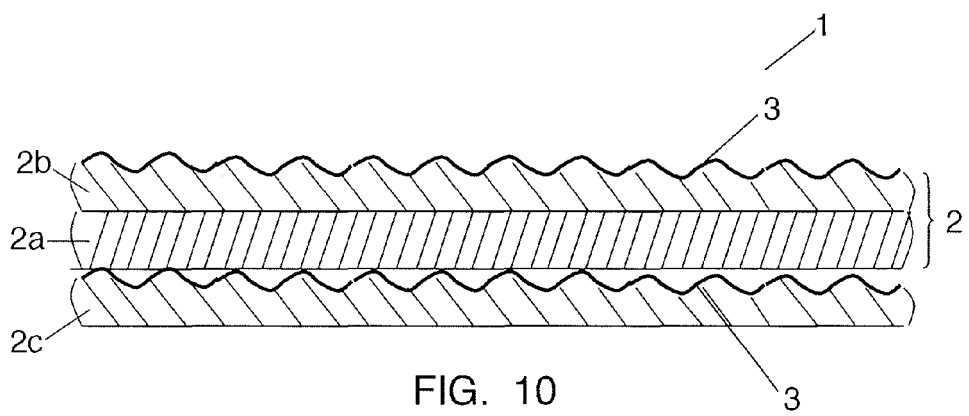
FIG. 10 is a cross sectional view of a capacitive transducer according to an alternative embodiment of the invention.

FIG. 10 is a cross sectional view of a capacitive transducer 1 according to an alternative embodiment of the invention. Similarly to the embodiment shown in FIG. 9, the capacitive transducer 1 of FIG. 10 comprises an elastomer film 2 arranged between two electrically conductive layers 3. A first layer 2a is made from a polymer material having a molecular weight of at least 21,000 g/mol, thereby exhibiting high electrical breakdown strength. A second layer 2b is made from a different material, e.g. having low viscosity prior to curing. Similarly to the situation described above with reference to FIG. 9, the first layer 2a forms a barrier layer, providing the desired high electrical breakdown strength to the elastomer film 2.

The capacitive transducer 1 of FIG. 10 is a front-to-back multi-layer structure. Therefore one of the electrically conductive layers 3 is arranged between the first layer 2a and a third layer 2c of elastomer material. The third layer 2c may, e.g., be made from the same material as the second layer 2b, similarly to the situation described above with reference to FIG. 9.

In FIG. 10 it appears that small air gaps are present between the first layer 2a and the electrically conductive layer 3 arranged between the first layer 2a and the third layer 2c. However, it should be noted that these gaps may alternatively be filled with a material, e.g. a glue used for laminating the structure together.

While the present invention has been illustrated and described with respect to a particular embodiment thereof, it should be appreciated by those of ordinary skill in the art that various modifications to this invention may be made without departing from the spirit and scope of the present.

What is claimed is:

1. A capacitive transducer comprising:
a polymer film having a first surface and a second surface,
a first electrically conductive layer arranged on the first surface of the polymer film, and
a second electrically conductive layer arranged on the second surface of the polymer film,
wherein the polymer film is at least partly made from a material having a molecular weight which is at least 21,000 g/mol,
wherein the polymer film is a structure comprising at least two layers of polymer material,
wherein at least a first of the layers of polymer material is made from a material having a molecular weight which is at least 21,000 g/mol, and at least a second of the layers of polymer material is made from a material having a molecular weight which is between 7,000 g/mol and 21,000 g/mol.

2. The capacitive transducer according to claim 1, wherein the polymer film is at least partly made from a material having a degree of polymerization which is at least 300.

3. The capacitive transducer according to claim 2, wherein the polymer film is at least partly made from a material having a degree of polymerization which is at least 500.

4. The capacitive transducer according to claim 1, wherein the polymer film is at least partly made from a material having a $SiO_2$ filler content of at least 10% by weight.

5. The capacitive transducer according to claim 1, wherein the polymer film is at least partly made from a material having a pyrogenic silica filler content of at least 10% by weight.

6. The capacitive transducer according to claim 1, wherein the polymer film is at least partly made from a material comprising an additive which increases the relative permittivity or the dielectric constant of the polymer film.

7. The capacitive transducer according to claim 1, wherein the polymer film is made from an elastomer.

8. The capacitive transducer according to claim 7, wherein the elastomer is a silicone elastomer.

9. The capacitive transducer according to claim 1, wherein the polymer film is at least partly made from a material having a molecular weight which is at least 35,000 g/mol.

10. The capacitive transducer according to claim 1, wherein the polymer film is at least partly made from a material having a molecular weight which is at least 350,000 g/mol.

11. The capacitive transducer according to claim 1, wherein the first surface of the polymer film and/or the second surface of the polymer film comprises a surface pattern of raised and depressed surface portions, and wherein the first electrically conductive layer and/or the second electrically conductive layer is/are deposited onto the surface pattern of the first and/or second surface, the first electrically conductive layer and/or second electrically conductive layer thereby having a corrugated shape.

12. The capacitive transducer according to claim 11, wherein the raised and depressed surface portions of the first and/or second surface have a shape and/or size which varies periodically along at least one direction of the respective surface.

13. The capacitive transducer according to claim 11, wherein the surface pattern comprises waves forming troughs and crests extending in essentially one common direction, each wave defining a height being a shortest distance between a crest and neighbouring troughs.

14. The capacitive transducer according to claim 13, wherein an average height of the waves is between ⅓ and 20 μm.

15. The capacitive transducer according to claim 1, wherein the first electrically conductive layer and/or the second electrically conductive layer has/have a thickness in the range of 0.01-0.2 μm.

16. The capacitive transducer according to claim 1, wherein the polymer film is a structure comprising at least three layers of polymer material, wherein at least a first of the layers of polymer material is made from a material having a molecular weight which is at least 21,000 g/mol, at least a second of the layers of polymer material is made from a material having a molecular weight which is between 7,000 g/mol and 21,000 g/mol, and at least a third of the layers of polymer material is made from a material having a molecular weight which is between 7,000 g/mol and 21,000 g/mol, and wherein the first layer is arranged between the second layer and the third layer.

17. The capacitive transducer according to claim 1, wherein at least the second of the layers of polymer material is made from a material having a degree of polymerization which is at least 300.

* * * * *